United States Patent [19]

Kenon

[11] Patent Number: 4,863,210

[45] Date of Patent: Sep. 5, 1989

[54] VEHICLE COVER

[76] Inventor: Willie L. Kenon, 3401 Chestnut Ave., Newport News, Va. 23607

[21] Appl. No.: 229,419

[22] Filed: Aug. 8, 1988

[51] Int. Cl.⁴ .............................................. B60J 11/00
[52] U.S. Cl. .................................. 296/136; 296/95.1; 160/370.2; 150/166
[58] Field of Search ............................ 150/52 K, 166; 160/370.2; 296/95.1, 98, 136

[56] References Cited

U.S. PATENT DOCUMENTS

| 3,021,894 | 2/1962 | La Due | 296/98 X |
| 3,338,293 | 8/1967 | Hohmann | 160/370.2 |
| 4,795,207 | 1/1989 | Clarke | 296/136 |
| 4,799,728 | 1/1989 | Akers et al. | 296/95.1 X |

FOREIGN PATENT DOCUMENTS 674216 11/1963 Canada ................................ 296/136

Primary Examiner—Johnny D. Cherry
Assistant Examiner—Andrew C. Pike
Attorney, Agent, or Firm—Griffin, Branigan & Butler

[57] ABSTRACT

A cover (12) for covering the cab of a motor vehicle (10) includes a shell (15) of flexible sheet material and at least two flaps (48, 50) attached to an interior surface (40) thereof along seams (52, 54) which respectively extend from portions of the shell for approximately covering lower corners (56, 58) of a front windshield (16) to portions of the shell for approximately covering top edges (60) of doors (62) of the motor vehicle. The flaps can be used for simultaneously pulling the shell tightly about the windshield and across the motor-vehicle top and can then be clamped between the doors and a motor vehicle body for holding the shell tightly about the windshield and the top. Attachment devices (44) are placed on the motor vehicle body at lower edges of front and back windshields (16, 20) for attaching to the shell, and side panels (34, 36) of the shell are expandable so that when the attachment devices attach the shell to the motor vehicle the side panels can be lifted for clamping the flaps between the doors and the body.

3 Claims, 1 Drawing Sheet

VEHICLE COVER

BACKGROUND OF THE INVENTION

This invention relates generally to the art of motor vehicle covers.

Motor vehicle covers have long been used for covering cabs as well as entire bodies of motor vehicles which must be temporarily, or permanently, left outdoors. It has been generally recognized that such covers protect the bodies of motor vehicles from wear and tear caused by weather, dirt, and pollution.

However, it is often difficult to securely mount motor vehicle covers to motor vehicles and for this reason, some owners only use such covers sparingly, many discontinuing their use altogether when they realize how difficult it is to apply them. Thus, it is an object of this invention to provide a motor vehicle cover which is relatively easy to securely mount on a motor vehicle.

Yet another difficulty which has been encountered by users of motor vehicle covers is that the covers are often stolen. Therefore it is an object of this invention to provide a motor vehicle cover which when it is installed on a motor vehicle is extremely difficult for others to remove.

It is a further object of this invention to provide a motor vehicle cover which is relatively inexpensive and uncomplicated to both construct and use.

SUMMARY

A motor vehicle cover according to this invention includes a shell of flexible material having at least two internal flaps, each internal flap being attached to an interior surface thereof along a seam which extends from a portion of the shell for approximately covering a lower corner of a vehicle's front windshield to a portion of the shell for approximately covering a top of a door of the vehicle. These internal flaps can be clamped between the motor vehicle's doors and body when the doors are closed. Such flaps can be used for simultaneously pulling the shell tightly about the vehicle's front windshield and over its top. Attachment devices are mounted on the motor vehicle to be used with the cover of this invention for attaching the cover to the motor-vehicle body approximately at the lower edges of front and back windshields. Side panels of the shell are resiliently expandable so that they can be lifted for clamping the flaps between the doors when the cover is attached to the attachment devices but so that they return to positions for tightly covering sides of the motor vehicle's body once doors are clamped onto the internal flaps.

BRIEF DESCRIPTION OF THE DRAWING

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DISCLOSURE OF THE PREFERRED EMBODIMENT

Figure 1:
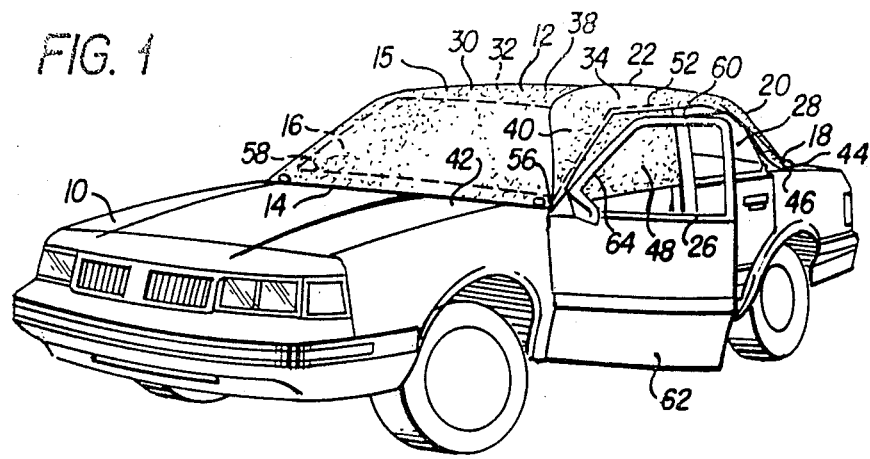
FIG. 1 is a side isometric view of a motor vehicle having a cover of this invention mounted thereon, but with a door of the motor vehicle being open and a side panel of the cover's shell being expanded upwardly.
Figure 2:
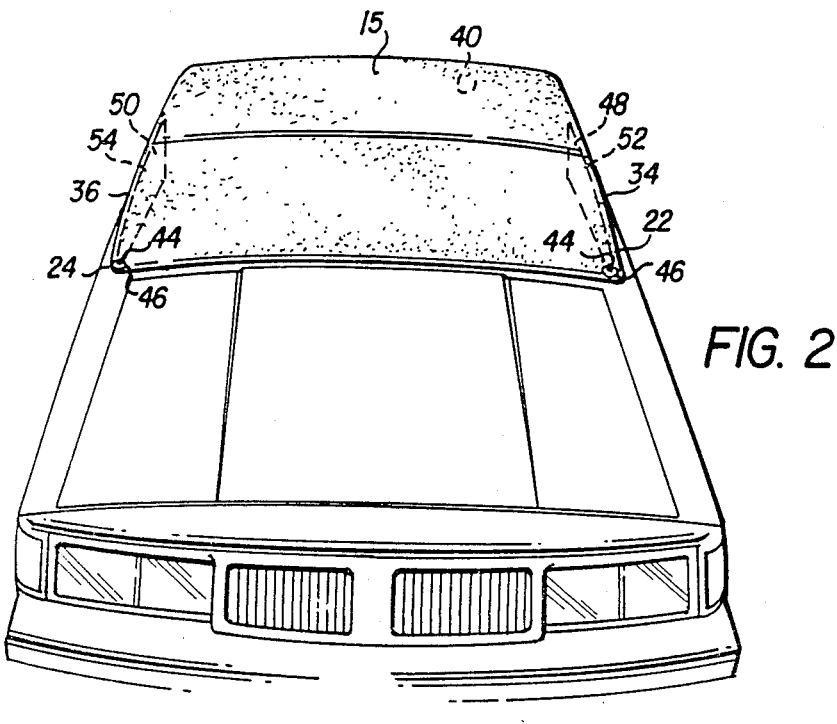
FIG. 2 is a front view of a motor vehicle having a cover of this invention mounted thereon with the doors of the motor vehicle being closed.
Figure 3:
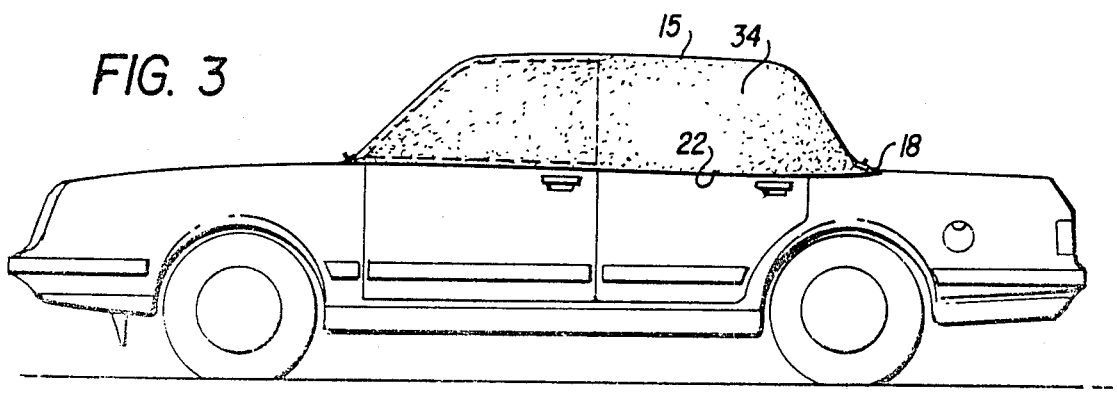
FIG. 3 is a side view of the motor vehicle and motor vehicle cover of FIG. 2.

A motor vehicle 10 is shown in the drawings having a cover 12 of this invention mounted only on a top of a cab thereof. That is, a front edge 14 of a shell 15 of the cover 12 is positioned approximately at a lower edge of a front windshield 16, a back edge 18 of the shell 15 is located approximately at a lower edge of a back windshield 20 and side edges 22 and 24 are located approximately at bottom edges of side windows 26 and 28.

The shell 15 of cover 12 has a central panel 30 which extends over the front windshield 16, a top 32, and the back windshield 20. Side panels 34 and 36 of the shell extend over the side windows 26 and 28 on both sides of the vehicle 10. The shell 15 has an exterior surface 38 which, when the shell 15 is mounted on the motor vehicle 10, is directed away from the motor vehicle 10, and an interior surface 40 which contacts the motor vehicle when the shell is mounted thereon.

Mounted to a vehicle body 42 are attachment devices 44, which in a preferred embodiment are protruding male members which extend through female snaps 46 mounted at the front and back edges 14 and 18 of shell 15 near lower corners of the front and back windshields 16 and 20. Thus, the front and back edges 14 and 18 of the shell 15 can be attached to the body 42 of the motor vehicle 10 just below bottom edges of the front and back windshields 16 and 20 as is depicted in the drawings.

Interior flaps 48 and 50 are attached to the interior surface 40 of the shell 15 along seams 52 and 54 which respectively extend approximately from portions of the shell 15 which cover left and right lower corners 56 and 58 of the front windshield 16 to portions of the shell 15 which approximately cover top edges 60 of side doors 62 when the cover 12 is mounted on the motor vehicle 10 and the doors 62 are closed. In this regard, "top edges" of side doors, as used in this application, refers to the tops of doors when they are their full size. That is, if there are no frames above side windows 26 and 28, then "top edges" refers to the tops of the side windows 26 and 28 when they are fully closed. However, when there are frames extending about the side windows 26 and 28, "top edges" refers to the tops of such frames.

Yet another aspect of this invention is that the shell side panels 34 and 36 are expandable and at least the lower side edges 22 and 24 thereof are elastic. This enables these side panels 34 and 36 to be easily lifted up even when the front and back edges 14 and 18 of the shell 15 are attached to the motor vehicle body 42 by the attachment devices 44 and 46. The side panels 34 and 36 can be made expandable by making them totally of an elastic material or they can be gathered with elastic lower side edges 22 and 24. The elastic side edges 22 and 24 allow the side panels 34 and 36 to be lifted but normally hold the side panels tightly against sides of the motor vehicle 10 so that the side panels 34 and 36 cover the side windows of the motor vehicle 10 when the cover is in place on the motor vehicle 10.

In use of the cover 12, the shell 15 is placed on top of the motor vehicle 10 and its front and back edges 14 and 18 are attached to the vehicle body 42 by the corner attachment devices 44 near lower corners 56 and 58 of the front and back windshields 16 and 20. In this regard, the flaps 48 and 50 can be used to help pull the central panel 30 across the front windshield 16 to assist in this attachment. The side panels 34 and 36 are then flexed upwardly, as the left side panel 34 is shown in FIG. 1, so that one can maintain access to the internal flaps 48 and 50 which now hang down in door openings. The flaps 48 and 50 are then pulled tightly rearwardly and downwardly to tighten the cover 12 about the front windshield 16 and over the top 32 of the motor vehicle 10. Once the cover is tightly pulled onto the motor vehicle, its doors 62 are pivoted about vertical axes to closed positions to thereby clamp the flaps 48 and 50 between top and front edges 60 and 64 of the doors 62 and the motor vehicle body 42. Thereafter, the side panels 34 and 36 are released and the elastic in the side edges 22 and 24 of the cover 12 pull the side panels 34 and 36 down over the side windows 26 and 28.

It will be appreciated by those of ordinary skill in the art, that the attachment devices 44 and 46 and the expandable side panels 34 and 36 cooperate to allow the cover 12 to be firmly mounted on a car prior to the flaps 48 and 50 being clamped between the doors 62 and the body 42. Further, the flaps 48 and 50, by extending from portions of the cover for approximately covering lower corners of the front windshield 16 to portions of the cover for approximately covering tops of the doors 62, allow one to use these flaps for pulling the cover 12 tightly about the front windshield 16 and over the top of the motor vehicle 10. Also, the flaps 48 and 50, when they are clamped between locked doors 62 and the body 42, prevent theft of the cover 12.

While the invention has been particularly shown and described with reference to a preferred embodiment, it will be understood by those skilled in the art that various changes in form and detail may be made therein without departing from the spirit and scope of the invention. For example, it would be possible to use the various aspects of this invention with a cover which covers an entire vehicle and not merely the top part of a cab as is depicted in the drawings.

The embodiments of the invention in which an exclusive property or privilege are claimed are defined as follows:

1. A motor vehicle cover for covering the cab of a motor vehicle, said cab having a top, front and back windshields, and side doors pivoted approximately on vertical axes, said motor vehicle cover comprising:
    a shell of flexible sheet material of a size for covering said motor-vehicle-cab top, front and back windshields and at least top portions of said side doors, said shell having an interior surface to be placed against said cab and an exterior surface to be directed away from said cab; and
    at least two flags attached to the interior surface of said shell along seams, said seams extending from first portions of said shell for approximately covering lower corners of said front windshield to second portions of said shell for approximately covering top edges of said side doors, each flap extending continuously from a said first portion to a said second portion along a respective seam, so that said flaps can be clamped between said doors and the rest of said motor vehicle when said doors are closed;
    whereby said flaps can be used for simultaneously pulling said shell tightly about said front windshield and across said top and said doors can thereafter be closed and locked on said flaps for holding said shell tightly about said front windshield and over said top for preventing the theft thereof.

2. A motor vehicle cover as in claim 2, wherein said side panels of said cover are expandable but include elastic therein for pulling the side panels tightly about said side doors when said cover is mounted on said vehicle.

3. A motor vehicle cover as in claim 2, wherein said cover further includes attachment devices for attaching front and rear edges of said shell to a body of said motor vehicle near lower edges of said front and back windshields.

* * * * *